C. H. TRAVIS.
FERTILIZER DISTRIBUTER.
APPLICATION FILED OCT. 11, 1918.
1,340,806.
Patented May 18, 1920.
2 SHEETS—SHEET 1.
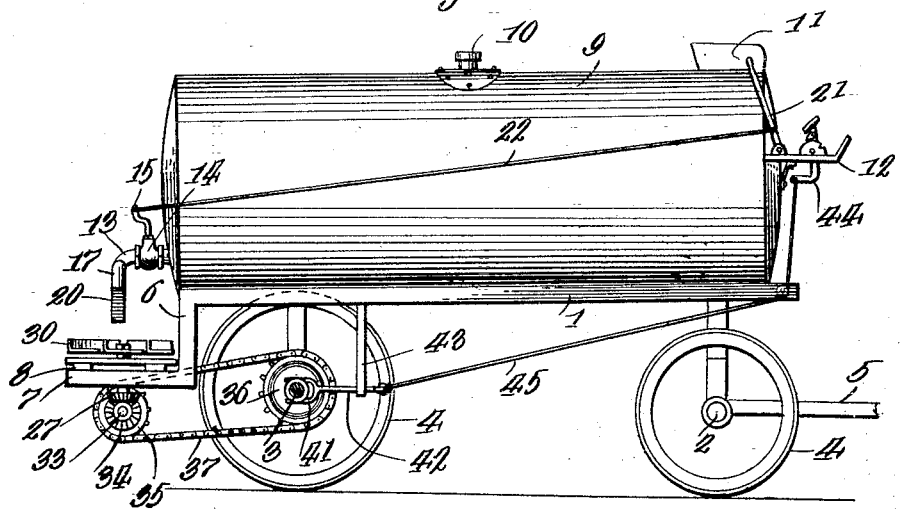
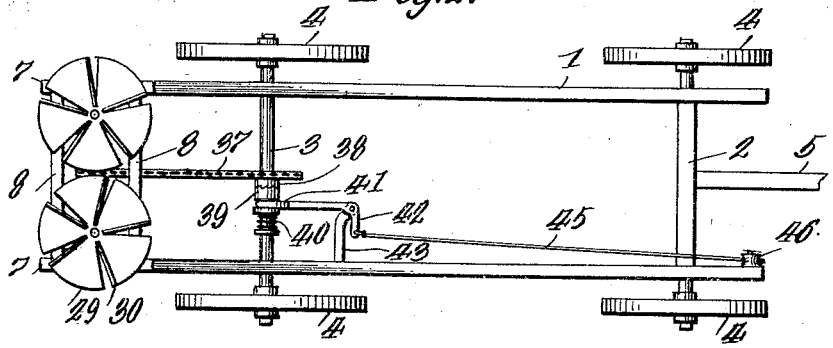
Witnesses
Guy M. Spring
J. P. Campbell
Inventor
Clayton H. Travis
By Richard B. Owen
Attorney

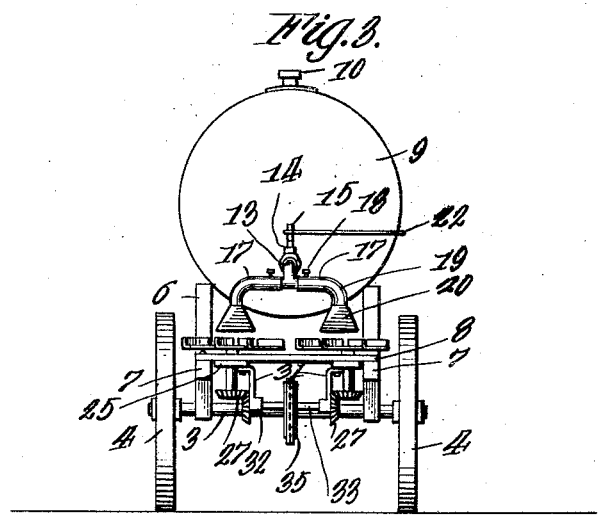

UNITED STATES PATENT OFFICE.

CLAYTON H. TRAVIS, OF POLO, ILLINOIS.

FERTILIZER-DISTRIBUTER.

1,340,806.   Specification of Letters Patent.   Patented May 18, 1920.

Application filed October 11, 1918. Serial No. 257,743.

*To all whom it may concern:*

Be it known that I, CLAYTON H. TRAVIS, a citizen of the United States, residing at Polo, in the county of Ogle and State of Illinois, have invented certain new and useful Improvements in Fertilizer-Distributers, of which the following is a specification.

My invention relates to new and useful improvements in a fertilizer distributer and more particularly to such a device adapted to distribute liquid fertilizer.

The principal object of the invention is the provision of a vehicle which may be drawn over the field and means for supporting a tank adapted to contain the fertilizer.

Another object is the provision of discharges leading from the tank and means for regulating such discharges.

A further object is the provision of rotatable distributers beneath the discharges whereby the liquid fertilizer will be thrown to the sides of the vehicle and deliver the fertilizer in the form of a spray.

Still another object resides in the provision of means connected to the vehicle whereby the distributers are rotated when the vehicle is drawn.

With these and other objects in view, my invention consists in the novel details of construction and arrangement of parts as will be more clearly understood from the following specification and drawings in which—

Figure 1 is a side elevation with one rear wheel removed.

Fig. 2 is a top plan of the vehicle frame, with the tank removed, and a top plan of the rotatable distributers and means for operating the same.

Fig. 3 is a rear elevation.

Fig. 4 a detail showing a top plan of one of the rotatable distributers.

Fig. 5 a fragmental sectional detail through one of the rotary distributers and the support therefor, showing in elevation the means for rotating the distributer, and Fig. 6 is a sectional detail showing the manner of coupling the discharge tubes to the tank outlet.

In the drawings, the numeral 1 indicates the vehicle frame which is supported upon a front axle 2 and a rear axle 3. Wheels 4 are rotatably mounted on both the front axle 2 and the rear axle 3 and a draft tongue 5 is secured to the front axle.

A downward extension 6 is formed on the rear end of the frame 1, as more particularly illustrated in Fig. 1 of the drawings, and right angle extensions 7 are formed on the member 6 and are connected by the spaced bars 8, more particularly illustrated in Figs. 2 and 4 of the drawings.

A tank 9 is adapted to be supported upon the frame 1 and this tank is provided with a filling opening indicated at 10 and a seat 11 may be supported upon the forward end of the tank in any desired manner. A foot rest 12 is also secured to the forward end of the tank as is more particularly illustrated in Fig. 1 of the drawings. An outlet pipe 13 extends from the rear end of the tank 9 and is provided with a valve 14 which is provided with an upwardly extending crank arm 15 for the purpose as will be presently described. The outlet pipe 13 is provided with the right angle extension 16 on each side thereof, as more particularly illustrated in Fig. 6 of the drawings and a pipe 17 is adapted to be secured on each end of the extension 16 by means of a thumb screw 18 or other suitable fastening means. The pipes 17 are provided with the downwardly extending portions 19 terminating in the enlarged nozzle 20, more particularly illustrated in Figs. 1 and 3 of the drawings. A lever 21 is pivotally connected to the foot rest 12 and a rod or other suitable coupling 22 is connected to the lever and extends toward the rear of the tank and is connected to the crank arm 15 for rotating the valve when the lever is operated. By this arrangement the valve is controlled for distributing the liquid fertilizer from the tank.

Plates 23 are supported upon the cross bars 8 and are provided with an opening through which a shaft 24 of a rotatable distributer is adapted to pass. A plate or strip 25 is secured to the underside of the plate 23 and is provided with an opening adapted to register with the opening in the plate 23. A collar or sleeve 26 surrounds the shaft 24 between the plate 25 and a beveled gear 27 which is secured to, or formed on, the lower end of said shaft 24. A rotatable distributer is secured upon the upper end of the shaft 24 by means of a nut 28 and these rotatable distributers comprise a plurality of blades 29 having flanges 30 formed on one edge thereof. The specific construction of these rotatable distributers is more particularly illustrated in detail in Figs. 4 and 5 of the drawings.

A bracket 31 is secured to the underside of the plate 25 and is provided on the lower end with a bearing 32 adapted to receive a shaft 33 which is provided on each end with a beveled gear 34. While I have only described one of the plates 23, shaft 24, plate 25, collar or sleeve 26, beveled gear 27, and one rotatable distributer, it will be understood that two are used, as illustrated in the drawings and it is not thought necessary to go further in detail as the description of one will answer the purpose of the two. A sprocket wheel 35, more clearly illustrated in Figs. 1 and 3 of the drawings, is connected centrally of the shaft 33 and a sprocket wheel 36 is secured to the rear axle 3, centrally thereof, and in alinement with the sprocket wheel 35. A chain 37 encircles and connects the sprocket wheels. The sprocket wheel 36 is preferably loosely mounted upon the axle 3 and is provided on one face with a toothed clutch member or face 38. A slidable clutch member 39 is keyed to the axle 3 and is normally held in contact with the clutch member 38 by means of the coiled spring 40. A slidable clutch member 39 is provided with a groove to receive the forked end 41 of a bell crank lever 42 which is pivotally connected to the frame 1 by means of the bracket 43. A lever 44, more particularly illustrated in Fig. 1 of the drawings, is pivotally connected to the foot rest 12 and a flexible connection 45 is connected to the lever 44 and to the bell crank lever 42 as illustrated in Figs. 1 and 2 of the drawings. This flexible connection 45 preferably extends around a pulley 46 illustrated in Figs. 1 and 2 of the drawings.

From the above detailed description it is thought that the operation of the invention can be clearly understood. As stated in one of the objects of the invention, my distributer is more particularly adapted for liquid fertilizer and results in a saving of fertilizer which has ordinarily been a waste. When manure is piled upon the ground and rain falls thereon it is a well known fact that the drainage from the manure pile could be utilized for fertilizing purposes although ordinarily such drainage is allowed to waste and thereby become a loss. It is my intention that such drainage should be accumulated in a suitable receptacle, which of course forms no part of the present invention, and can be taken from this receptacle and placed in the tank 9 by means of the filling opening 10. The draft animal is connected to the tongue 5 and the vehicle is drawn over the field to be fertilized. The lever 44 is operated thereby drawing upon the flexible connection 45 and through means of the lever 42 operates the slidable clutch member 39 to contact with the clutch member 38. When this is done then the gear 36 will be operated and through means of the chain 37 will impart rotation to the gear 35. The gear 35 will impart motion to the shaft 33 and the rotatable distributers are then rotated in view of the fact that the beveled gears 27 and 34 mesh. When the distributers are rotated the lever 21 is then operated and through means of the connection 22 opens the valve 14 which allows the liquid fertilizer to flow out through the discharge pipes 13. It will then flow through the pipes 17 and be discharged onto the rotatable distributers through the nozzle 20. It will thus be seen that the liquid fertilizer will be discharged over the field in the form of a spray and the rapid rotation of the distributers will throw the fertilizer some distance thereby making a minimum number of trips possible. When sufficient fertilizer has been distributed the valve 14 is again closed and the lever 44 operated so as to release the clutch member 39 from the clutch member 38 against tension of the spring 40. When the clutch members are out of engagement, the sprocket wheel 36 will freely rotate upon the axle 3 so that motion will not be imparted to the shaft 33 and the rotatable distributers will then remain idle.

The discharge spouts or nozzles 20 may be adjusted over the distributers by releasing the thumb bolts 18 and sliding the pipes 17 on the extensions 16. If it is desired to fertilize in rows, such as to fertilize rows of corn, etc., the rotatable distributers may be done away with and the liquid fertilizer discharged directly from the nozzles 20 onto the ground or plant. In order to remove the rotatable distributers the plate 23 may be disconnected from the bars 8.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having fully described my invention what I claim as new and desire to secure by Letters Patent, is:

A fertilizer distributer comprising a wheel supported frame, right angle extensions formed on one end of the frame, spaced bars connected on the right angle extensions, a plate connected to the bars adjacent each end, brackets secured to the under sides of the plates, a horizontal shaft carried by the brackets and provided with a beveled gear on each end, a vertical shaft extending through each plate and provided on the top with a distributing disk and on the bottom with a beveled gear meshing with the beveled gear on the respective end of the horizontal shaft, means for rotating the horizontal shaft, a tank carried on the wheel supported frame, a nozzle leading from the tank and distributing pipes adjustably connected to the nozzle for adjustment over the upper faces of the distributing disks.

In testimony whereof I affix my signature in presence of two witnesses.

CLAYTON H. TRAVIS.

Witnesses:
ROBERT M. BRAND,
N. T. SCHELL.